United States Patent
Bell et al.

(10) Patent No.: US 9,315,889 B2
(45) Date of Patent: Apr. 19, 2016

(54) HYDRIDE ASSEMBLING SYSTEM AND METHOD OF MAKING A HYDRIDE BATCH

(71) Applicant: Kidde Technologies, Inc., Wilson, NC (US)

(72) Inventors: Kenneth Frazer Bell, Raleigh, NC (US); Steven Patrick Wallace, Raleigh, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 101 days.

(21) Appl. No.: 13/852,746

(22) Filed: Mar. 28, 2013

(65) Prior Publication Data

US 2014/0290801 A1 Oct. 2, 2014

(51) Int. Cl.
*C23C 8/08* (2006.01)
*C01B 3/00* (2006.01)
*F17C 11/00* (2006.01)

(52) U.S. Cl.
CPC ............ *C23C 8/08* (2013.01); *C01B 3/0005* (2013.01); *F17C 11/005* (2013.01); *Y02E 60/321* (2013.01); *Y02E 60/324* (2013.01)

(58) Field of Classification Search
CPC ........... B01J 7/02; B01J 19/22; Y02E 60/362; C01B 3/065
See application file for complete search history.

(56) References Cited

U.S. PATENT DOCUMENTS

| | | | |
|---|---|---|---|
| 3,277,860 A | 10/1966 | Lindberg | |
| 6,680,042 B1 * | 1/2004 | Schulz et al. | 423/644 |
| 6,936,185 B1 | 8/2005 | Schulz et al. | |
| 2002/0088178 A1 * | 7/2002 | Davis | 48/61 |
| 2011/0000781 A1 * | 1/2011 | Krishna et al. | 204/157.43 |

FOREIGN PATENT DOCUMENTS

EP 0708055 A1 4/1996
JP 61233298 A 10/1986

OTHER PUBLICATIONS

European Search Report regarding related EP Application No. 14162234.0-1354; dated Aug. 29, 2014; 7 pages.
Sandrock, G.F., et al., "Applications," Hydrogen in Intermetallic Compounds II, Berlin, Heidelberg, New York: Springer, DE, pp. 197-258; XP008136481; ISBN: 3-540-54668-5.

* cited by examiner

*Primary Examiner* — Stanley Silverman
*Assistant Examiner* — Syed Iqbal
(74) *Attorney, Agent, or Firm* — Cantor Colburn LLP

(57) ABSTRACT

A hydride assembling system includes a first spool configured to support a sensor tube assembly comprising a wire disposed within a sensor tube. Also included is a hydrogen inlet fluidly coupled to the first spool for providing hydrogen from a hydrogen plenum. Further included is a second spool configured to receive the sensor tube assembly as the sensor tube assembly is fed from the first spool. Yet further included is a heated section at a temperature above an ambient temperature and configured to heat the sensor tube assembly as the sensor tube assembly is fed through the heated section.

6 Claims, 2 Drawing Sheets

HYDRIDE ASSEMBLING SYSTEM AND METHOD OF MAKING A HYDRIDE BATCH

BACKGROUND OF THE INVENTION

The present invention relates to hydrides, and more particularly to a hydride assembling system, as well as a method of making a hydride batch.

Hydrides have many uses and are formed in various configurations. They are typically constructed by inserting a wire into a tube to form a tube assembly. The tube assembly is immersed in a hydrogen atmosphere and heated to a temperature above an ambient temperature. In the elevated temperature environment, the wire absorbs the hydrogen, thus becoming a hydrided material. At typical ambient temperatures, hydrogen is trapped in the hydride material, but as the ambient temperature increases, the hydrided material outgases the hydrogen and increases the pressure in a surrounding volume. Such a characteristic is useful in certain applications, such as fire detection systems, for example.

The assembly process commonly entails sealing one end of the tube assembly and introducing hydrogen to the other end in the heated condition. Unfortunately, such a process may lead to substantial non-uniformity of the hydrogen distribution along the length of the tube assembly. Additionally, by forming each hydride segment of a batch in an individual manner, the process is often slow and imprecise.

BRIEF DESCRIPTION OF THE INVENTION

According to one embodiment, a hydride assembling system includes a first spool configured to support a sensor tube assembly comprising a wire disposed within a sensor tube. Also included is a hydrogen inlet fluidly coupled to the first spool for providing hydrogen from a hydrogen plenum. Further included is a second spool configured to receive the sensor tube assembly as the sensor tube assembly is fed from the first spool. Yet further included is a heated section at a temperature above an ambient temperature and configured to heat the sensor tube assembly as the sensor tube assembly is fed through the heated section.

According to another embodiment, a method of making a hydride batch is provided. The method includes winding a wire onto a first spool, the first spool in close proximity to a hydrogen inlet. The method also includes heating a heater section above an ambient temperature. The method further includes supplying hydrogen to the hydrogen inlet from a hydrogen plenum. The method yet further includes feeding the wire from the first spool through the heater section and toward a second spool. The method also includes absorbing hydrogen within the wire during the feeding of the wire from the first spool toward the second spool.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
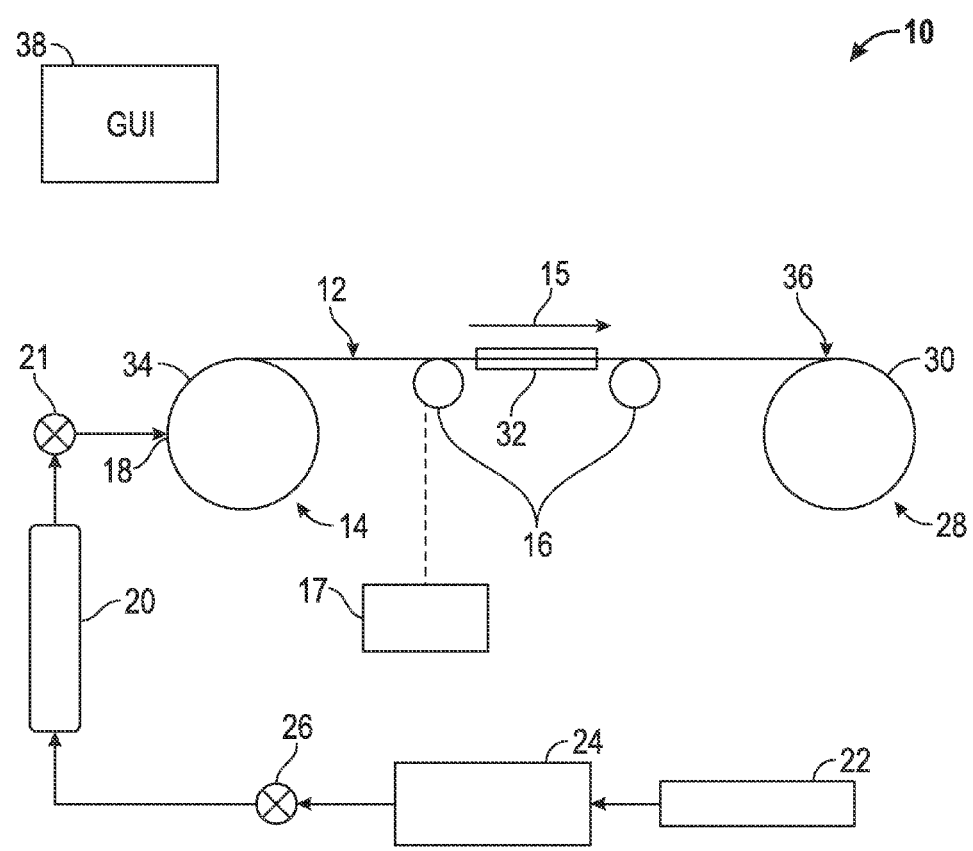
FIG. 1 is a schematic illustration of a hydride assembling system.

Referring to FIG. 1, a hydride assembling system 10 is schematically illustrated. The hydride assembling system 10 is employed to assemble hydride material comprising a sensor tube assembly 12. The sensor tube assembly 12 includes a wire that is inserted into a sensor tube and disposed therein. The wire and the sensor tube may be formed of various materials. In one embodiment, the wire comprises a metal (e.g., titanium) and the sensor tube comprises a stainless steel tube. Once hydrided, the sensor tube assembly 12 may be used in conjunction with numerous systems. One such system is a pneumatic fire detector for use on an aircraft. In particular, the sensor tube assembly 12 may be used in an aircraft engine for detection of fires therein. However, an aircraft is merely an exemplary application and it is to be appreciated that the sensor tube assembly 12 may be employed in numerous alternative applications.

As noted above, the hydride assembling system 10 is used to continuously produce a batch of stock hydrided material. The hydride assembling system 10 includes a first spool 14 that is configured to support a previously constructed length of the sensor tube assembly 12. In particular, the sensor tube assembly 12 is wound onto the first spool 14 and arranged to be fed away from the first spool 14 in a direction 15 with a roller assembly 16 comprising a system of rollers and guides. The roller assembly 16 is controlled by a feed speed controller 17 to adjust the feed speed of the sensor tube assembly 12. Proximate the first spool 14 is a hydrogen inlet 18 that is fluidly coupled to a hydrogen plenum 20 that contains a hydrogen supply at a controllable pressure. The hydrogen inlet 18 is configured to introduce hydrogen to a location proximate the first spool 14 in a manner that provides hydrogen to the sensor tube assembly 12. In one embodiment, an end of the sensor tube assembly 12 is directly coupled to the hydrogen inlet 18 to introduce hydrogen directly into the end of the sensor tube assembly 12. The flow rate and amount of hydrogen supplied via the hydrogen inlet 18 is regulated with a first valve 21, such as a solenoid valve that may open and close in a pulsed manner.

The hydrogen plenum 20 is in fluid communication with a hydrogen tank 22 that is configured to supply the hydrogen plenum 20 with hydrogen gas, as needed. As shown, the pressure of the hydrogen supplied from the hydrogen tank 22 may be regulated with a hydrogen pressure regulator 24 before being routed to the hydrogen plenum 20, with a second valve 26 controlling the flow rate of the hydrogen to the hydrogen plenum 20. In one embodiment, the second valve 26 comprises a solenoid valve.

The hydride assembling system 10 includes a second spool 28 that is configured to receive and support the sensor tube assembly 12 as it is fed away from the first spool 14. Disposed proximate the second spool 28 is a vacuum component 30 that is configured to remove air from the sensor tube assembly 12. In addition to simply removing air, in one embodiment the vacuum component 30 may recycle hydrogen to the hydrogen tank 22 and/or the hydrogen plenum 20 during the hydriding process. As the sensor tube assembly 12 is fed along the roller assembly 16, the sensor tube assembly 12 is fed through a heated section 32 that is positioned between the first spool 14 and the second spool 28. The heated section 32 comprises a section that is configured to heat the sensor tube assembly 12 during translation therealong. In one embodiment, the heated section 32 is a tubular section that is configured to allow the sensor tube assembly 12 to pass therethrough. The heated section 32 is controlled to a temperature that facilitates continuous absorption of hydrogen into the wire within the sensor tube assembly 12 as the sensor tube assembly 12 is drawn through the heated section 32. The precise temperature that is required to ensure continuous absorption will vary depending on the sensor tube assembly 12. Characteristics such as wire material and thickness, for example, are variables that will affect the necessary temperature. In one embodiment, the temperature is elevated to a temperature greater than about 300° C. (about 572° F.).

Also dependent upon various characteristics of the wire, and more generally the sensor tube assembly 12, is the desired amount of hydrogen to be absorbed into the wire. Specifically, a desired concentration of hydrogen, measured by volume and/or length of the wire, is dependent upon the particular application. To determine the amount of hydrogen absorbed by the wire, a pressure differential between a location of the wire proximate the first spool 14 and the second spool 28 is monitored. The pressure drop between these locations allows a user to calculate the mass of hydrogen absorbed into the wire. Monitoring of the pressure differential is facilitated by the inclusion of a first pressure gauge 34 disposed proximate the first spool 14 and a second pressure gauge 36 disposed proximate the second spool 28.

Several components of the hydride assembling system 10 are monitored with a graphical user interface (GUI) 38 that is in operative communication with components of the hydride assembling system 10. Specifically, the hydride assembling system 10 may be employed to monitor the first pressure gauge 34, the second pressure gauge 36, the first valve 21, the second valve 26, the heated section 32, and/or the feed speed controller 17. By monitoring the above-referenced components, the GUI 38 is configured to control a plurality of operating characteristics of the hydride assembling system 10. Such characteristics include a feed rate of the wire, a temperature of the heated section 32, a pressure within the hydrogen plenum 20, and a flow rate of hydrogen flowing through the first valve 21 or the second valve 26. Monitoring and controlling these components and characteristics allows a user to modify operation of the hydride assembling system 10, as needed. Such control advantageously allows for continuous and consistent hydriding of the sensor tube assembly 12, thereby lowering production cost and time, as well as increasing hydrogen concentration uniformity throughout a length and/or volume of the sensor tube assembly 12. These benefits are obtained as a result of the above-described characteristics and parameters determining the amount of hydrogen absorbed and the ability of it to remain absorbed.

Figure 2:
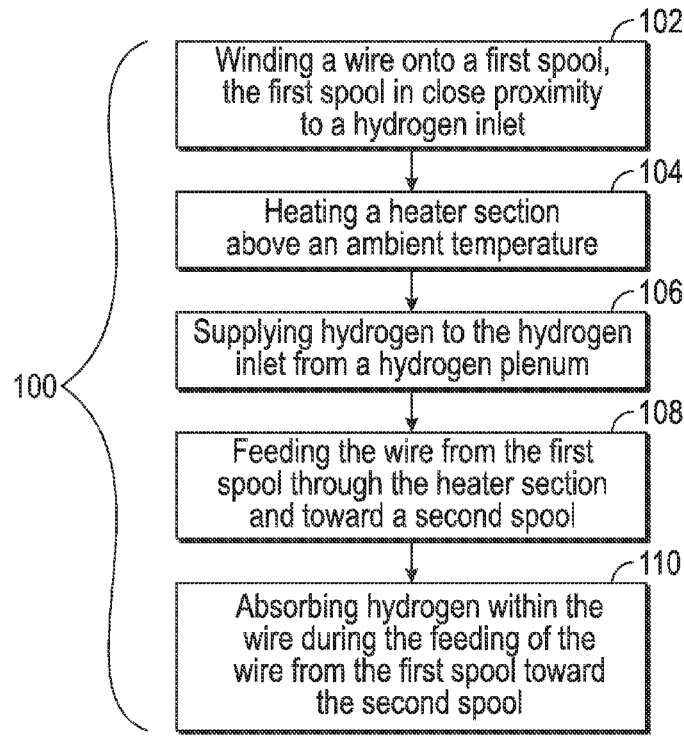
FIG. 2 is a flow diagram illustrating a method of making a hydride batch.

A method of making a hydride batch 100 is also provided, as illustrated in FIG. 2 and with reference to FIG. 1. The hydride assembling system 10 has been previously described and specific structural components need not be described in further detail. The method of making a hydride batch 100 includes winding 102 a wire onto the first spool 14, wherein the first spool is in close proximity to the hydrogen inlet 18. The heater section 32 is heated 104 above an ambient temperature. The method 100 also includes supplying hydrogen 106 to the hydrogen inlet 18 from the hydrogen plenum 20. The wire is fed 108 from the first spool 14 through the heater section 32 and toward the second spool 28 as the hydrogen is absorbed 110 within the wire during the feeding 108 of the wire from the first spool 14 toward the second spool 28.

Figure 3:
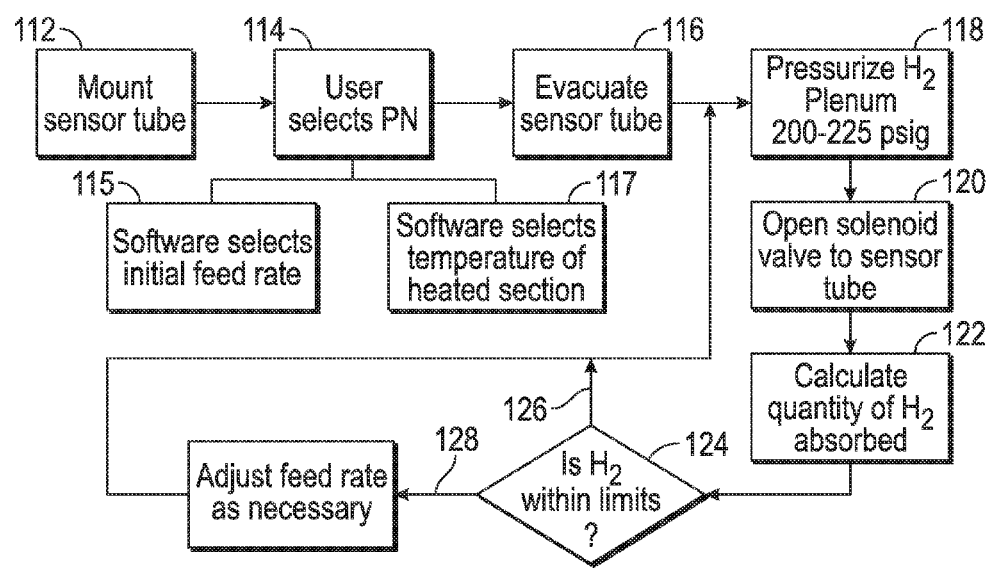
FIG. 3 is a flow diagram illustrating the method of making a hydride batch according to another aspect of the invention.

In addition to the general processes described above in conjunction with the method of making a hydride batch 100, FIG. 3 depicts a flow diagram illustrating an embodiment comprising processes that the method 100 entails. Specifically, the sensor tube assembly 12 is first mounted 112 to the first spool 14. A user may then interact with the GUI 38 to select 114 a specific identifier, such as a part number, that requires specific hydride properties. Based on this selection, software of the GUI selects an initial feed rate 115 of the sensor tube assembly 12. Additionally, an initial temperature of the heated section 32 is selected 117. Air within the sensor tube assembly 12 is then evacuated 116, as described above. The hydrogen plenum 20 is pressurized 118 to a pressure that will vary depending on the particular application, but in one embodiment the pressure ranges from about 100 psig to about 250 psig. The first valve 21 is opened 120 to introduce hydrogen to the hydrogen inlet 18 and therefore the sensor tube assembly 12. By monitoring the pressure differential, the quantity of hydrogen absorbed within the wire may be calculated 122. At this point, a determination 124 is made as to whether the quantity of hydrogen is within a desired range. If so 126, the process continues at the current feed rate. If not 128, the feed rate is adjusted with the feed speed controller 17. This closed loop process continues until the user halts the process.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hydride assembling system comprising:
a sensor tube assembly comprising a wire disposed within a sensor tube;
a first spool configured to support the sensor tube assembly;
a hydrogen inlet fluidly coupled to the first spool for providing hydrogen from a hydrogen plenum;
a second spool configured to receive the sensor tube assembly as the sensor tube assembly is fed from the first spool;
a heated section at a temperature above an ambient temperature and configured to heat the sensor tube assembly as the sensor tube assembly is fed through the heated section to absorb hydrogen into the wire to form a hydride; and
a vacuum component disposed proximate the second spool and operable to remove air during formation of the hydride and recycle hydrogen to the hydrogen plenum.

2. The hydride assembling system of claim 1, further comprising:
a first pressure gauge disposed proximate the first spool; and
a second pressure gauge disposed proximate the second spool.

3. The hydride assembling system of claim 1, further comprising a solenoid valve disposed between the hydrogen plenum and the first spool for regulating the supply of hydrogen to the hydrogen inlet.

4. The hydride assembling system of claim 1, further comprising a graphical user interface in operative communication with at least one component.

5. The hydride assembling system of claim 4, wherein the at least one component comprises a pressure gauge, a solenoid valve, the heated section, and a feed speed controller.

6. The hydride assembling system of claim 1, further comprising a roller assembly configured to translate the sensor tube assembly.

\* \* \* \* \*